United States Patent Office 3,237,116
Patented Feb. 22, 1966

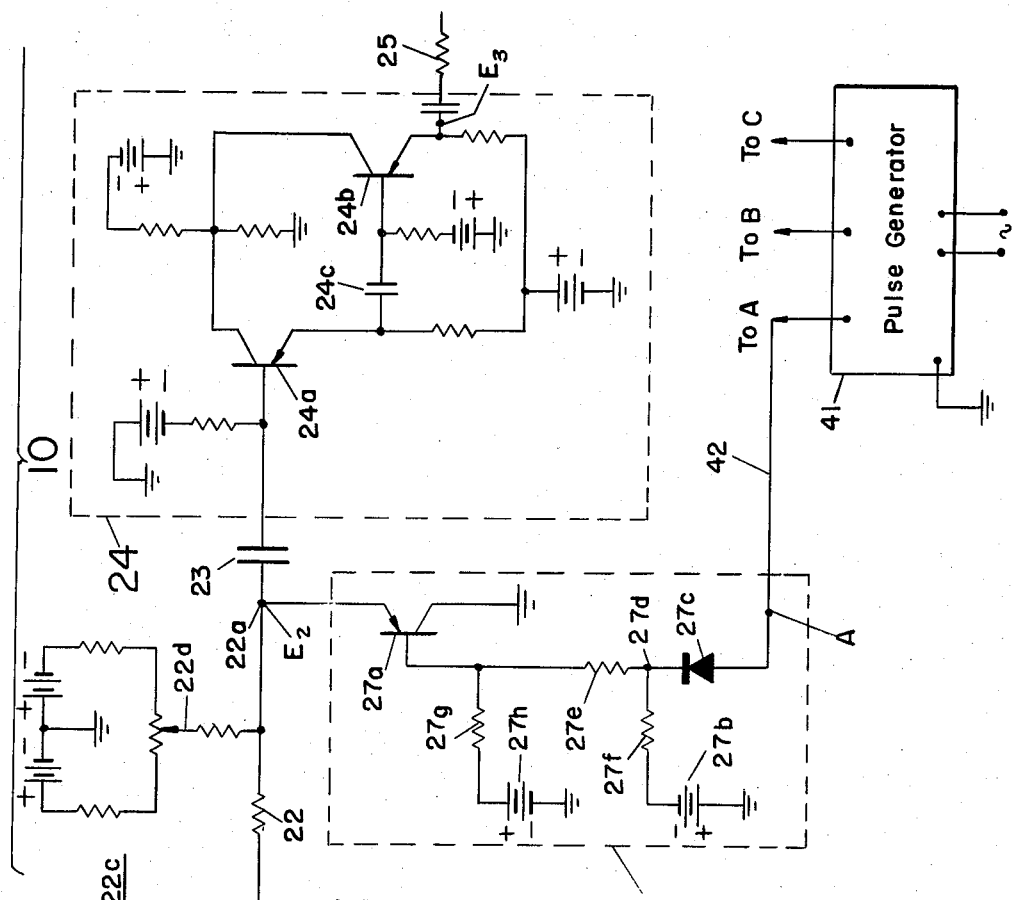

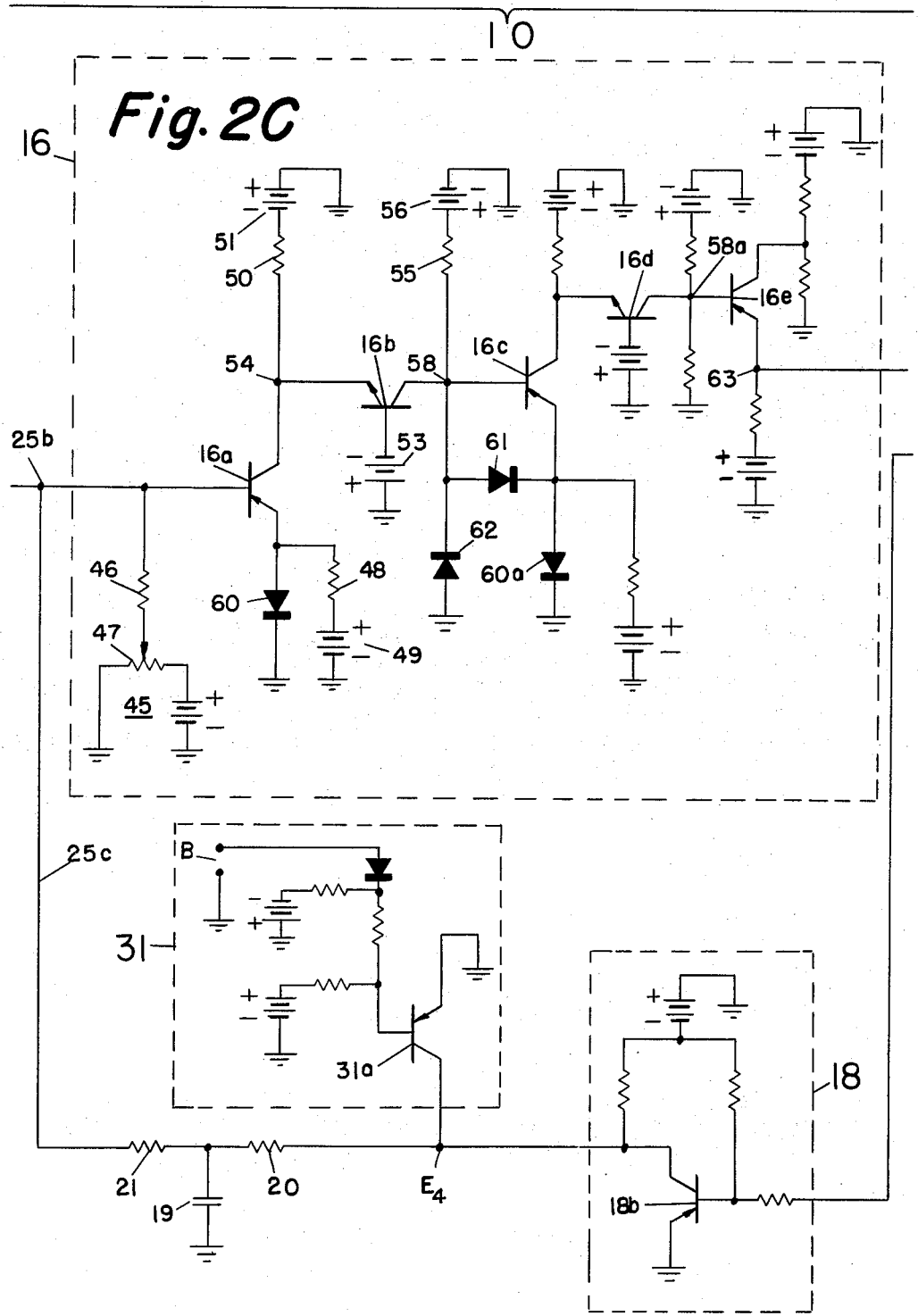

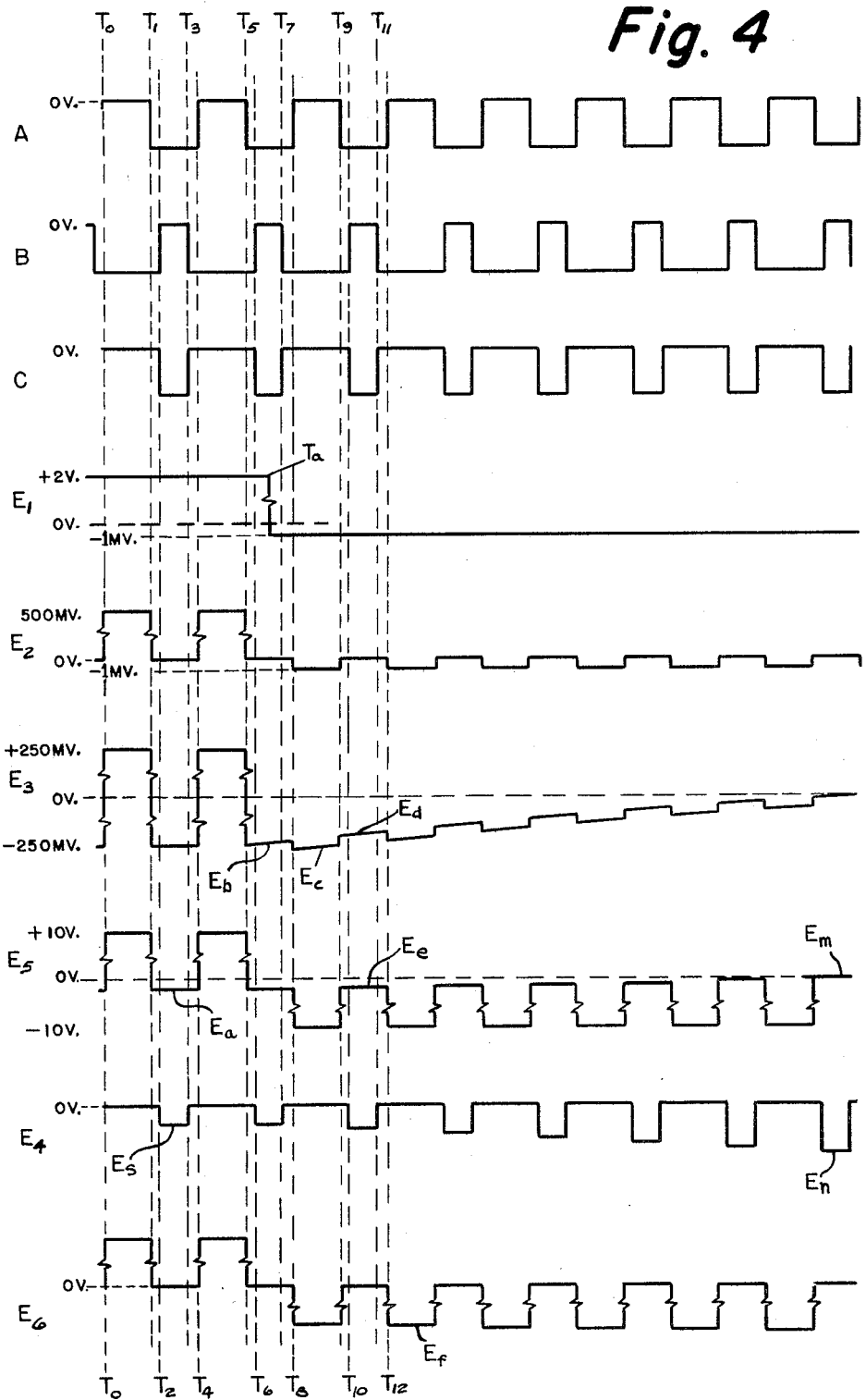

3,237,116
AMPLIFIERS AND CORRECTIVE
CIRCUITS THEREFOR
Richard A. Skinner, Philadelphia, and Murray Garden, Oreland, Pa., assignors to Leeds and Northrup Company, Philadelphia, Pa., a corporation of Pennsylvania
Filed Dec. 14, 1961, Ser. No. 159,274
11 Claims. (Cl. 330—9)

This invention relates to amplifiers of the type having corrective means for eliminating from the output effects of zero drift as well as changes in its quiescent output voltage.

Those skilled in the art are familiar with various schemes which have been proposed which include negative feedback circuits for maintaining the operation of direct coupled amplifiers in the linear region of their characteristic curves and which also introduce corrections to compensate for zero drift which may arise due to changing ambient temperature and change in the electrical characteristics of the circuit components. While systems of this kind have been satisfactory, they leave something to be desired for applications where the input signals may be successively sampled and may vary over wide ranges and where speed of response must be quite high. These unusual operating conditions are present in analog-to-digital converter systems of the kind where an analog input, which may be a current level, is compared with successive known levels of standard currents for production of a representative digital output which may be in binary-coded-decimal form or other well-known digital form. In such systems, the unknown analog current is subtracted from the standard currents and a resultant current applied as an input to a comparator amplifier. Thus, for a first step, the unknown current may be compared with a large-valued standard current for production of a large-valued resultant input to the comparator amplifier. At the next step, the standard current may closely approximate the unknown current and a balance is produced for a resultant input to the amplifier of a low order of magnitude. Thus, the comparator amplifier must respond not only to input signals of large amplitude but must also maintain its sensitivity to input signals which rapidly and suddenly decrease to zero as a limit. In analog-to-digital converters, the speed of operation is required to be quite high as for example, up to 200 kilocycles per second or more which refers to the rate of production of bits.

In carrying out the invention in one form thereof, there is provided an amplifier which is compensated for shift in its quiescent output voltage. The compensation is provided by a capacitor connected in series in the output circuit of the amplifier and by a negative feedback circuit. The negative feedback circuit derives a negative feedback signal from that part of the output circuit on the amplifier side of the series capacitor. Included with the negative feedback circuit is an energy-storing means which receives and stores the feedback signals. For operation of the amplifier, there is provided a circuit-controller which concurrently and cyclically:

A. connects (during a correction part of the cycle of operation)
(1) a source of reference potential to the input circuit of the amplifier;
(2) a source of reference potential to that part of the output circuit connected to the series capacitor on the side remote from the amplifier for establishing a charging circuit for the series capacitor. In this manner, the series capacitor receives a charge proportional to the quiescent output voltage of the amplifier; and
(3) the negative feedback circuit to that part of the output circuit on the amplifier side of the series capacitor so that there is applied to the negative feedback circuit the quiescent output voltage of the amplifier having its input circuit connected to the source of reference potential.

B. and disconnects (during the operational part of a cycle of operation)
(1) the source of reference potential from the input circuit;
(2) the source of reference potential from the output circuit; and
(3) the feedback circuit from the output circuit.

In this manner, input signals applied to the amplifier are amplified with the bias of the amplifier adjusted to correct for shift in the quiescent output voltage. In addition, the signals at the output of the amplifier have subtracted therefrom the quiescent output voltage stored by the series capacitor.

For a more detailed understanding of the invention, reference is to be had to the following description taken in conjunction with the accompanying drawings in which:

FIG. 2A illustrates how FIGS. 2B, 2C and 2D are to be combined;

FIGS. 2B, 2C and 2D are a detailed wiring diagram of a preferred embodiment of FIG. 1;

FIG. 3 illustrates the waveforms of switching pulses produced by pulse generator 41;

FIG. 4 illustrates the waveforms appearing at selected points in the comparator amplifier of FIGS. 1 and 2A–2C.

Figure 1:
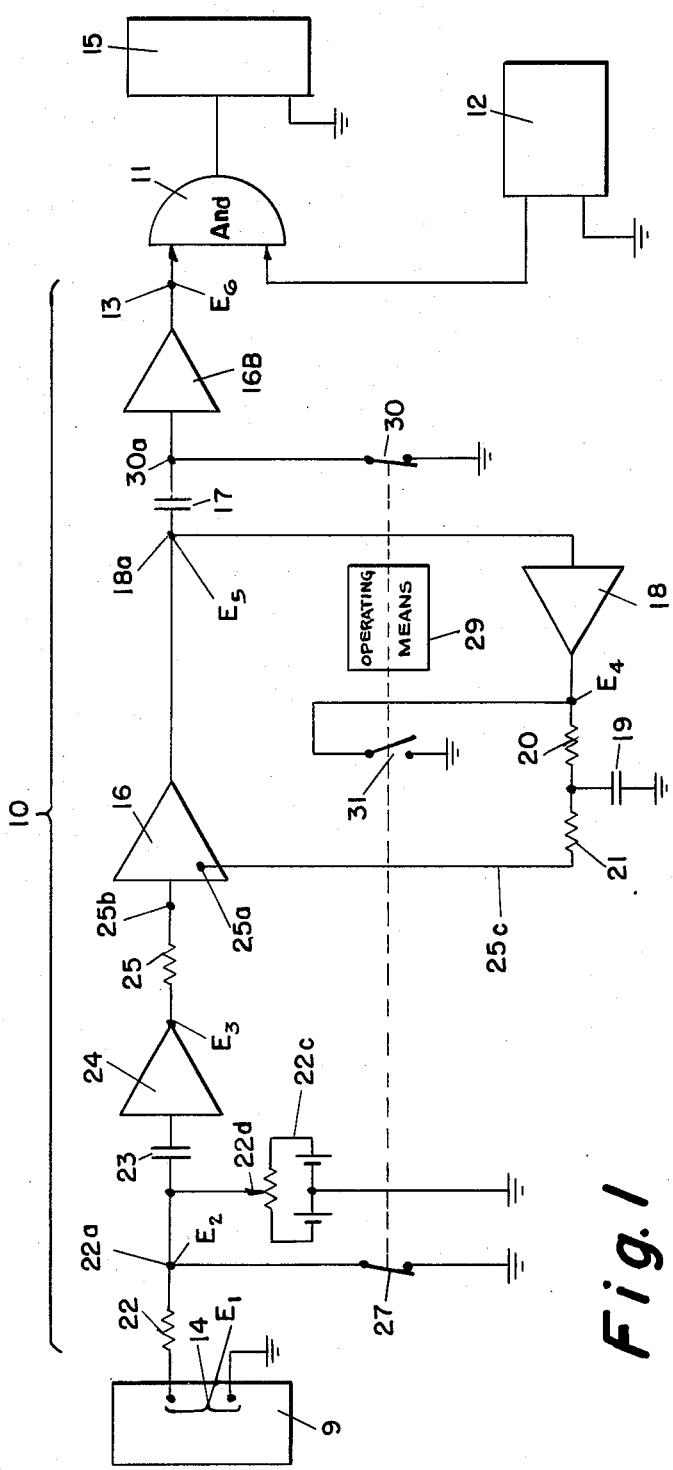
FIG. 1 is a block diagram of a comparator amplifier embodying the invention including blocks representing the system within which the amplifier operates.

Referring now to FIG. 1, the invention has been illustrated as applied to a comparator amplifier 10 having its output circuit 13 connected to a comparator gate 11. This gate 11 has been illustrated as an AND circuit having two inputs one from the comparator amplifier 10 and the other from a strobe or timing source 12. When there are concurrently applied to both inputs of the gate 11 pulses of the same selected instantaneous polarity, the gate is rendered conductive and the output is utilized for operation of a further part of the system indicated by the rectangle 15. Accordingly, it will be seen that the output from the amplifier 10 must be free from effects of drift if there is to be assurance: (1) that there will be zero output applied to the comparator gate with zero input applied to the input terminals 14 of the amplifier and (2) that the amplifier 10 will respond to input signals which rapidly vary over wide amplitude ranges.

The comparator amplifier 10 includes as its principal amplifying element a plurality of stages of amplification shown as a direct coupled amplifier 16 having a capacitor 17 connected in series in its output circuit. The input circuit extends from input terminals 14, to which there may be applied input signals from an external source 9. The input circuit includes an input resistor 22, a coupling capacitor 23, an amplifier 24 of the alternating current type and a resistor 25. From resistor 25 the input is applied to the first of a plurality of input stages of amplifier 16. The amplifier 16 may be either of the single-ended or differential type. If single-ended, the negative feedback circuit including a feedback conductor 25c will be connected as at 25b. Where of the differential type, the feedback circuit will be connected to another input of amplifier 16 as to the control element of a differential stage included therein. In addition to the storage capacitor 17 in the output circuit of amplifier 16, there is provided a further amplifier 16B of the direct coupled type of high input impedance in the output circuit of capacitor 17.

If the source 9 be assumed to be a part of a digital converter system which compares an unknown current level with a plurality of differing levels of standard currents, then it will be understood that the magnitudes or amplitudes of input signals applied to input terminals 14 will vary from very high levels which may be ten thousand times greater than input signals corresponding with the value of the lowest standard current to very low levels approaching zero as a limit and which will still produce an enabling pulse for the AND circuit 11.

As already mentioned, input signals varying over such a wide range will produce saturation and blocking of amplifiers having sensitivities or gains adequate to produce minimum desired outputs for input signals approaching zero as a limit.

It is an object of the present invention to overcome the foregoing problems. This is done in part by providing the coupling capacitor 23 and the alternating current amplifier 24 of the high impedance input type. Thus, if a high amplitude signal be momentarily applied to the coupling capacitor 23, it will transmit the signal without acquirement of any substantial charge. The high level signal is then transmitted by way of coupling resistor 25 to the direct coupled amplifier 16 which will be driven to operate within a region in which its output will be voltage or current limited. Inasmuch as such an output is utilized solely as an enabling pulse for the AND circuit 11, its high amplitude is of no consequence and is transmitted by way of storage capacitor 17 and direct coupled amplifier 16B to AND circuit 11.

Since an unknown current in device 9 has first been compared with the known current and this has resulted in a large input signal to terminals 14, the next comparison may result in a greatly decreased input signal at terminals 14. As this process continues, it will be seen that the coupling capacitor 23 will have its charge gradually increased. Inasmuch as the gain is quite high, the presence of any change in the direct current component of the input signal may eventually suppress any output signal due to the input signal at terminals 14. Similarly, any drift in the zero of amplifier 16 will act the same as an input signal of a low order of magnitude and thus a spurious signal will be produced at the AND gate 11 and the reliability required will not be provided.

To avoid both the effects of high level input signals on storage elements such as capacitor 23 in the alternating current amplifier 24, and otherwise in the circuit, and also to compensate for drift in the zero of the direct coupled amplifier 16, the following provisions are made.

With the parts in their illustrated positions, it will be seen that the point 22a of the input circuit is connected through circuit controller or switch 27 to ground. Ground may be considered a reference potential. Similarly, the point 30a of the output circuit is by circuit controller or switch 30 connected to ground. With both the input and output circuits grounded, as described, it will be noted that the circuit-controller switch 31 is open and accordingly a feedback circuit is thereby rendered effective. This feedback circuit extends from point 18a of the output circuit and includes a direct coupled amplifier 18 and a filter circuit comprising resistors 20 and 21 and an energy-storing means such as the capacitor 19. As before described, this negative feedback circuit extends by way of conductor 25c to an input of the amplifier 16 to perform conventional negative feedback functions for amplifier 16. Accordingly, the quiescent output voltage of the amplifier 16, defined as the voltage at point 18a with the point 22a connected to ground or to the reference potential, will be applied to the amplifier 18 and after filtering will develop a charge on capacitor 19 and through resistors 20 and 21 will be applied to an input of the amplifier 16 illustrated by input terminal 25a. Concurrently the quiescent output voltage will be applied to capacitor 17 through a charging circuit completed by the closure of the circuit controller 30.

It is here emphasized that the development of the negative feedback circuit signal on amplifier 16 has been accomplished during periods with the input and output circuits connected to ground. In this manner all voltages affecting the quiescent output voltage of amplifier 16 between the points 22a and 18a will be effective in producing an input to the feedback amplifier 18 and thus their effects will be greatly reduced in the subsequent operation of the amplifier 16. Though it would seem that this correction might be adequate to reduce to zero the quiescent output voltage at point 18a, such has not been found to be the case in practice. Notwithstanding the provision of feedback amplifier 18, the quiescent output voltage at point 18a has tended to rise and fall, and partly in dependence upon the past history of operation. However, by providing the output capacitor 17 in the output circuit and with periodic completion of its charging circuit by way of circuit controller 30 for the quiescent output voltage of amplifier 16, there is introduced into the operation a further corrective action. In brief, the capacitor 17 acquires a charge of magnitude and of polarity which when later added to the signal output from amplifier 16 will correct for any quiescent output voltage at 18a developed during the corrective or feedback part of the cycle of operation just described.

It is to be understood that the circuit controllers, or switches, 27, 30 and 31 are for the comparator or current-comparing circuit previously described operated at high speed. Since they will be required to operate to open and close the described circuits at the rate of two hundred kilocycles per second, it will be understood that the limitations are excessive for mechanically operated switches and accordingly as will be explained in connection with FIGS. 2A–2D, the transistor-type of switch will be utilized for the above-described functions. For simplicity, however, and for applications where the speeds of operation may be less, the switches or circuit controllers 27, 30 and 31 may be of the vibrator type, more particularly, where one vibrating reed will operate the switch 27 and one or two vibrating reeds utilized for the operation of the switches 30 and 31. The operating means has been symbolically represented by the rectangle 29.

The results of rapidly opening and closing the switch 27 will be the application to the capacitor 23 of an input signal of the square wave type, varying in one direction from the reference or ground potential. It is in this way that a unidirectional signal when applied to the input terminals 14 may be amplified by the alternating current amplifier 24.

Considering now the parts in their illustrated positions and the circuit controllers 27, 30 and 31 operating at high speed, the switches 30 and 31 will be on the same or on different reeds of a vibrator but operated respectively to their open and closed positions just prior to the opening of the switch 27. This is done for the reason that an input signal may be and will likely be present at the input terminals 14 and by first, in effect, disconnecting the feedback circuit from the output of amplifier 16, and then by interrupting the charging circuit for the capacitor 17, there is avoided the possibility of changing the charge on either of capacitors 17 or 19 due to an output of amplifier 16 resulting from an input signal at input terminals 14. There is also avoided the possibility of change in the charges on those capacitors due to disturbing switching transients inevitably present in opening and closing circuits, including high gain amplifiers. Accordingly, with switches 30 and 31, respectively, open and closed, the opening of switch 27 thereupon applies an input signal to the amplifier 10. If the resulting output signal as applied to the AND gate 11 is of the same polarity and occurs at the same time as the pulse from the timing generator or strobe 12, the AND gate 11 is enabled and produces an output for use in the utilization circuit illustrated by rectangle 15 and which may in some cases form an integral part of the input circuit 9.

With the above understanding of the invention, it will be understood that the foregoing cycle of operations is repeated and that the effects of any charge which may accumulate on capacitor 23 (and other capacitors which may be included in the input circuit) will be compensated for by reason of the combined actions of capacitors 17 and 19 respectively charged from the quiescent output voltage of amplifier 16. These compensating effects likewise include any zero drift of direct coupled amplifier 16.

It is to be noted that the time constant of the filter comprising resistors 20 and 21 and capacitor 19 will be made long relative to the period of operation of the chopper switch 27. The filter has a time constant which effectively eliminates from the negative feedback signal applied to the input 25a any frequency corresponding with the chopper frequency. Additionally, the time constant for the circuit, including the coupling capacitor 23, is made materially and consequentially longer than the time constant of the filter just described. It is in this manner that the charging rate for the capacitor 23 is a value which permits the negative feedback circuit of the amplifier 18 and its associated filter to compensate for the charge which capacitor 23 will acquire. The time constant for the charging circuit of output series capacitor 17 (lacking any illustrated resistance in series therewith) is of a low order compared with the time constant of that capacitor with the switch 30 open and then effectively included in the high impedance input circuit of amplifier 16B.

In some applications of the invention as for example for the analog-to-digital converter system, it may be desirable to provide a predetermined output as at point 13 for amplifier 10 with zero input at the terminals 14. In accordance with the present invention, this may be readily accomplished without adversely affecting the corrective circuits including capacitors 17 and 19 by connecting a potentiometer 22c with its adjustable contact 22d connected at the input side of capacitor 23. The potentiometer 22c is provided with suitable sources of supply indicated as two direct current cells with their intermediate point connected to ground. In this manner and with a zero input signal applied to terminals 14, an output signal at 13 may be developed of the order of a fraction of that required for producing a signal representative of a bit in the lowest order of the binary-coded-decimal. Such an input signal aids in the operation of a system to produce signals representative of a bit in the lowest order when, for example, the input signal from potentiometer 22c is representative of a half bit and there is applied to the input terminals 14 an input signal having a value equal to or greater than that corresponding with a half bit. Whatever the magnitude required of the input signal developed from potentiometer 22c, it will be noted that when the switch 27 is closed, the input signal from potentiometer 22c is effectively removed from the input circuit at 22a since the potentiometer circuit is then short-circuited or connected directly to ground.

Figure 2D:
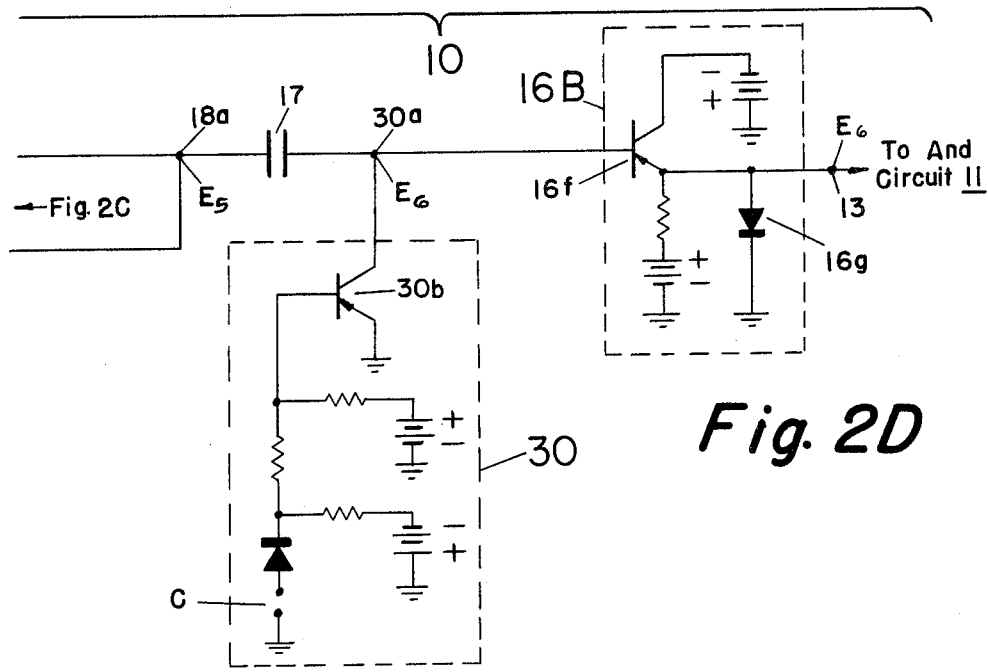

Referring now to FIGS. 2B–2D, there has been illustrated a preferred form of the invention utilizing the previously mentioned transistor-type of circuit controllers and also utilizing throughout amplifiers of the solid state type. Inasmuch as the operation is quite similar to the embodiment of FIG. 1, it is believed that the system of FIGS. 2B–2D may be readily understood by assuming the application to the input terminals 14 of input signals. Such input signals are limited in amplitude by a pair of back-connected diodes 40. Thus, the input signals, amplitude-limited, are applied by resistor 22 to a coupling capacitor 23 for the alternating current amplifier 24. This amplifier comprises transistors 24a and 24b, each of the PNP type. This amplifier is of the conventional emitter-follower type and includes a coupling capacitor 24c and the usual sources of supply indicated by the batteries. The output from this amplifier 24 is applied by way of resistor 25 to the input of the direct current amplifier 16. This amplifier includes five amplifying stages formed by transistors 16a–16e and, as shown, it is of the single-ended input type. Accordingly, the negative feedback circuit traced by way of conductor 25c is connected to the input of the first stage 16a as at the point 25b.

The amplifier 16 is not of conventional design, and the subject matter thereof forms the basis of a copending application Serial No. 163,232, filed December 29, 1961, by one of the co-inventors hereof.

For the purposes of the present description, the amplifier 16 can be considered in terms of its function in providing high gain for the input signals applied at its input circuit as at point 25b. There will later be presented a brief description of the operation of the amplifier 16.

The output of the amplifier 16 is applied by way of capacitor 17 to a final amplifier 16B shown as including a single transistor 16f and which is of a conventional PNP type. It includes a diode 16g for limiting the amplitude of the output signals applied to the output circuit as at point 13. The foregoing description of the operation of the system of FIGS. 2B–2D has assumed implicitly that the circuit controllers 27 and 30 have disconnected the points 22a and 30a from ground, considered as a reference potential, and that the circuit controller 31 has effectively disconnected the feedback circuit extending from point 18a from the direct current feedback amplifier 18. It is to be noted that these switching circuits are all of the transistor type and that the amplifier 18 includes a single transistor 18b and is further of the conventional PNP grounded emitter type.

It is to be observed that the circuit controllers, or switches, 27, 30 and 31 are of identical design and, therefore, only one of them, the switching circuit 27, need be described in detail. The switch 27 includes a transistor 27a of the PNP type. The transistor 27a will preferably be of the type which when fully turned on, that is, operating within its saturation range, has a saturation resistance of a low order. Additionally, it exhibits a low order of offset voltage and offset current. Typical of a suitable transistor is that made by the Philco Corp. under its designation T-1558.

The transistor 27a has a high speed of response in that it may be rapidly turned from its fully on to its fully off state and thus meets the requirements of the previously described high frequency operation of circuit controller 27, of the order of 200 kilocycles per second.

The switching operations for transistor 27a are controlled by the application of switching pulses to its input terminal A and which may be generated by a pulse generator 41 having an output conductor 42 labeled "to A." Such pulses as illustrated in FIG. 3 at A, may be in the form of a train of square wave signals carying from zero to predetermined negative values. When the input signal at the input terminal A has a zero value, it is to be assumed for purposes of explanation, since a fact in practice, that that input terminal is "shorted," i.e., connected to ground. Thus a battery 27b, of 30 volts, is effective to apply a relatively high forward bias to a diode 27c. This diode becomes conductive, and ground potential then appears at the junction 27d between a pair of voltage dividing resistors 27e and 27f. This shift in potential in the voltage dividing network, also including a resistor 27g and a battery 27h, results in the application between the base and collector of transistor 27a of a positive potential. The positive potential applied to the base of transistor 27a turns it fully off and thus interrupts the circuit between point 22a and ground. When the next switching pulse is applied to terminal A, it will be of negative-going character of amplitude to apply to the diode 27c a reverse bias which turns off that diode. The point 27d then shifts to a negative potential of value to overcome the bias developed by the battery 27h and applies a negative signal of large amplitude to the base of transistor 27a. This transistor is then turned fully on effectively to connect point 22a to ground. In order that the voltage divider will shift the switching potentials in the manner described, it is understood, of course, that the batteries 27b and 27h will be properly selected and will have polarities as indicated, and that the resistors forming the several additional components of the voltage dividing network will have suitably selected values. Those skilled in the art will understand how these will be selected, how the polarities will be adjusted to suit the type of transistor, as between the PNP type, the NPN type, and otherwise. In the arrangement illustrated for the Philco T-1558 transistor, one arrangement was found to be satisfactory with battery 27b 30 volts, battery 27h 18 volts, and resistors 27e, 27f and 27g respectively 7,500 ohms, 13,000 ohms and 82,000 ohms.

The synchronization in the operation of the circuit controllers 30 and 31 with the circuit controller 27 is readily accomplished by developing from the pulse generator control pulses which, as illustrated in FIG. 3, originate and terminate shortly after and before the origins of pulses applied to terminal A. In this manner, the rectangular negative-going pulses C, as illustrated in FIG. 3, operate circuit controller 30 to be conductive and non-conductive during the time the circuit controller 27 is conductive and non-conductive; whereas, the pulses applied to the B terminal of circuit controller 31 are displaced in time relative to the signals applied to terminals A and C so that when the circuit controller 30 is operated to its closed position, circuit controller 31 is operated to its open position, and vice versa. In this connection, it is to be observed that while the switching circuits for the controllers 30 and 31 have been described as substantially identical with the switching circuit for the controller 27, it is nevertheless to be observed that there is a slight difference, namely, the transistor 31a of circuit controller 31 and the transistor 30b of circuit controller 30 have grounded emitters instead of grounded collectors. Thus the first circuit controller 27 utilizes an inverted connection for the transistor 27a, a connection found to be advantageous in that there is developed less offset voltage at point 22a with the transistor 27a turned on, and thus there is minimized the application of any spurious signal to the input to the amplifier during the correction part of its cycle of operation.

The circuit controllers 30 and 31 differ from the circuit controller 27 in that both of the circuit controllers 30 and 31 are connected to the output of the amplifier 16. Remembering that the output may be of a high order of magnitude, it will be understood that the voltages developed may likewise be high, and higher than transistors of reasonable cost can withstand if such voltages be applied to their emitters. Accordingly, the connections of the emitters to ground and the respective collector to the points 30a and to the output of amplifier 18 will be preferred. In consequence, transistors such as the 2N1309 may be utilized for transistors 30b and 31a. In other respects, however, the operations of the several switching circuits are identical, it being understood that the values of the resistors will be adjusted to meet the requirements of the switching functions of these transistors of differing type and compatible with the voltage and impedance levels of the points being connected to and disconnected from ground.

As previously described, the amplifier 16 includes five amplifying stages formed by transistors 16a–16e. It will be remembered that the negative feedback circuit traced by way of conductor 25c is connected to the input of the first stage 16a as at point 25b. That feedback circuit produces only negative potential feedback signals as a result of the amplifier 18 which includes a PNP grounded emitter type of transistor having only a negative source of supply connected thereto. In order to provide a resultant feedback signal for the amplifier 16 which will develop an output from that amplifier which may vary both positively and negatively with a zero level as a midpoint, a positive potential bias is added to the negative feedback signal. The positive potential bias is developed from a biasing source 45 including a resistor 46 and a potentiometer 47 for application of a positive potential bias of desired value to the input of amplifier 16. One end of resistor 46 is connected to the base of transistor 16a and its outer end is connected to the adjustable contact of potentiometer 47.

The resultant of the feedback signal and the bias is algebraically added to the output of the amplifier 24 to produce an input signal for the first stage 16a of the direct coupled amplifier 16. Amplifier 16 includes a first pair of transistors 16a and 16b followed by a second pair of transistors 16c and 16d. Each pair of transistors comprises a common-emitter stage formed by transistors 16a and 16c of the PNP type, with each followed by a common-base stage respectively formed by transistors 16b and 16d of the NPN type. In addition, the amplifier 16 includes an output stage of the conventional emitter-follower type formed by transistor 16e of the PNP type.

In explaining the operation of the amplifier 16, it will first be assumed that the input signal to the first stage 16a is of negative polarity and of high amplitude. Since transistor 16a is of the PNP type, the high negative input signal biases that transistor to its highest conductivity state for development of a high, but limited, value of emitter current. The magnitudes of the emitter and collector currents are limited by a constant current source formed by the battery 49 and the resistor 48. The resistor 48 has a relatively high value so that the emitter current will be limited to a value less than that required to produce saturation of the transistor 16a. In this manner, the emitter current of transistor 16a is limited in magnitude for the high values of signals produced at the output of amplifier 24 and applied as an input to amplifier 16 thereby to avoid saturation of transistor 16a. With the emitter current of input transistor 16a so limited in magnitude, the amplifying stages 16a and 16b function below their saturation levels.

With lower values of input signals, the emitter current of transistor 16a will be less than the constant current developed by the battery 49 and the resistor 48. That portion of the constant current in excess of the emitter current will render conductive diode 60 and flow therethrough to ground and to the negative side of battery 49. With diode 60 conductive, the emitter of transistor 16a will be maintained at a low impedance with respect to ground and thus that transistor will exhibit the characteristics of a common-emitter connected transistor. In its common-emitter connection, transistor 16a provides large current gain. This characteristic of common-emitter connected transistors is described in detail in the "Handbook of Semiconductor Electronics," edited by Lloyd P. Hunter, McGraw-Hill, 1956, at chapter 11, page 20 et seq.

The transistor 16b is connected in its common-base configuration with its base connected to the negative side of battery 53, the positive side of which is connected to ground. Further, the emitter of transistor 16b is connected to the collector of transistor 16a at the junction point 54. It will be seen that a biasing circuit for the emitter and base of transistor 16b may be traced from the base to the emitter of that transistor to point 54 and through resistor 50, battery 51 (from the negative to the positive side) to ground and through the battery 53 (from the positive to the negative side). The battery 53 is selected to have a potential smaller than that of the battery 51 and the potentials of both batteries are selected (1) to maintain conductive transistor 16b and (2) to prevent saturation of that transistor for all values of collector current developed by transistor 16a. In the foregoing biasing circuit, as the collector current of transistor 16a incrementally increases, the current flowing through resistor 50 increases and the potential drop across that resistor also increases. However, as the point 54 becomes more positive, the transistor 16b is less conductively biased resulting in a decrease in the flow of its emitter current. As the collector current of transistor 16a increases, the emitter current of transistor 16b decreases so that the total current flowing through the resistor 50 is maintained at approximately a fixed level. Thus the potential drop across resistor 50 and the potential at the point 54 are also maintained at approximately fixed levels. The manner in which the potential of the point 54 is maintained at a substantially fixed potential may also be seen when it is considered that the forward biased emitter-base junction of transistor 16b provides a relatively small resistance. Thus, the point 54 has applied thereto a potential approximately equal to that of battery 53. Thus, the point 54 is maintained at a substantially high constant negative potential with respect to ground.

With transistor 16a conductive and its emitter-base junction forward biased, it will be understood that its emitter-base resistance will be of a low order of magnitude. In addition, the conductive diode 60 will also have a low resistance value. Accordingly, the resistance from base to ground is relatively small and thus the negative potential that may be developed between base and ground of the conductive transistor 16a is also of a relatively low order of magnitude. Since the collector of transistor 16a is maintained at a substantially high constant negative potential with respect to ground, it will now be seen that the potential difference between that collector and its base is maintained at a substantially high constant value. As a result of the foregoing, it will be understood by those skilled in the art that the cutoff frequency of transistor 16a will be maintained at a substantially high value so that the large gain of transistor 16a is produced over a wide frequency range.

As already stated, with the collector current of transistor 16a of a high order of magnitude, the emitter current of transistor 16b will be of a low order of magnitude, and there will be thus developed a relatively small collector current for transistor 16b which flows from the positive side of battery 56, through resistor 55, to that collector. As a result of the relatively small collector current, the output terminal or junction 58, which is connected to the collector of transistor 16b, is at its highest positive potential with respect to ground.

In the manner described above, the common-emitter, common-base pair of transistors 16a and 16b inverts or reverses in phase the output signal relative to the input to result in a maximum positive signal.

The maximum positive or negative output signals which may be developed at the output terminal 58 are limited in magnitude by means of a pair of diodes 61 and 62. The diode 62 has its cathode connected to point 58 and its anode to ground while the diode 61 has its anode connected to point 58 and its cathode connected to the anode of a diode 60a. In this manner, the diode 62 limits the maximum negative potential that may be developed at the point 58, while the diode 61 in combination with the diode 60a limits the maximum positive potential that may be developed at the point 58.

Since the amplifying stages formed by the transistors 16a and 16b are identical in design to the amplifying stages formed by the transistors 16c and 16d, the operation of the last-named stages need not be described. It will be clear that the signals applied to the base of transistor 16c from the terminal 58 will produce at the point 58a phase-reversed signals and now in phase with those applied to the input of the amplifier 16.

Those skilled in the art will understand that the transistors 16a–16d may all be of the PNP type or all of the NPN type or any combination of the two types of transistors. With changes in the type of transistors 16a–16d, corresponding changes will be made in the polarities of the sources of supply.

The output terminal 58a is connected to the input circuit of a conventional emitter-follower stage formed by the transistor 16e. There is included in that stage the usual sources of supply as indicated by the batteries and an output circuit including a terminal 63 having a connection to the output terminal 18a of the amplifier 16.

The foregoing operation of the amplifier 10 of FIGS. 1, 2A–2D will now be explained in terms of the waveforms of FIG. 4. For purposes of explanation, it will be assumed that a +2 volt D.C. signal $E_1$ has been applied to the input terminals 14 over a long period of time, only the latter portion of which time has been illustrated by the waveform $E_1$. The +2 volt input signal $E_1$ is limited in amplitude by the righthand diode of the back-connected diodes 40, FIG. 2B, so that the maximum potential that may be developed at the point 22a with the circuit controller or transistor switch 27 in its open, circuit-interrupting state, will be approximately 500 millivolts with respect to ground as shown by the waveform $E_2$. As a result of the application to the switch 27 of the square wave switching pulses A, the waveform $E_2$ is also of square wave shape with a maximum value of 500 millivolts as for example between times $T_0$ and $T_1$ and a zero or ground reference potential as for example between times $T_1$ and $T_4$. This square wave output signal at point 22a is applied to the coupling capacitor 23 and to the alternating current amplifier 24 which produces at its output point $E_3$ an output signal illustrated by the waveform $E_3$ which cyclically changes between values of +250 millivolts and —250 millivolts.

As a result of the foregoing, the output potential $E_3$ of the amplifier 24 is at its maximum negative value during the correction part of the cycle of operation, as for example between times $T_1$ and $T_4$. The negative feedback signal will then have its smallest amplitude in the negative direction as shown at $E_s$ on waveform $E_4$. That feedback signal $E_s$ is filtered and algebraically added to the output $E_3$ of amplifier 24 and to the positive potential bias from the biasing source 45 to produce an output from the amplifier 16 designated $E_a$ on waveform $E_5$. The output $E_a$ of amplifier 16 provides a high or maximum negative value of input to the feedback circuit which by reason of phase reversal by the amplifier 18 produces a negative feedback signal $E_s$ having its smallest negative amplitude, i.e., its maximum value in the positive direction.

The foregoing value of negative feedback signal $E_s$ is to be compared with its normal negative value designated by $E_n$ on waveform $E_4$. Absent any output signal $E_3$ from amplifier 24, the normal value $E_n$ of negative feedback signal will be filtered and added to the positive potential bias developed from the biasing source 45 to produce an output $E_m$ on waveform $E_5$ of zero potential, as at the output of amplifier 16.

At time $T_a$, between times $T_6$ and $T_7$, the input signal $E_1$ applied to the input terminals 14 is abruptly reduced to —1 millivolt. By reason of the application of the constant-voltage unidirectional input signal $E_1$ applied over a period of time in excess of the long time constant of capacitor 23, it will have acquired a charge. Thus, at time $T_a$, as a result of the reduction in the input voltage $E_1$ to its reversed and low negative values, the capacitor 23 will, since switch 27 is still closed, begin to discharge. The resultant change in the input signal to amplifier 24 is reflected by the decreasing output signal $E_b$ on waveform $E_3$.

At time $T_8$ the switch 27 opens, disconnects the capacitor 23 from ground and applies to the input circuit of amplifier 24 by way of capacitor 23 the new low-valued signal. Since of reversed instantaneous polarity, it adds to the charge of the capacitor 23 and produces an increased negative output signal $E_c$ at the output of amplifier 24. This signal also decreases in amplitude due to discharge of the capacitor 23 by way of the input circuit of the amplifier 24 until time $T_9$. At time $T_9$, the switch 27 again closes to connect capacitor 23 to ground with abrupt decrease of the input signal to amplifier 24 to reduce its output as shown at $E_d$.

The closing of switch 27 at time $T_9$ followed by the closing of switch 30 at time $T_{10}$ initiates a correction part of the cycle. The output of amplifier 16, waveform $E_5$, is reduced by reason of the reduced output, $E_d$, of amplifier 24 and the value of the negative feedback signal increases in the negative direction.

The foregoing description applies to the succeeding cycles of operation. As the progressive discharge of capacitor 23 progressively reduces the negative amplitudes of waveform $E_3$, the negative feedback progressively increases. After a plurality of cycles, the waveform $E_3$ will again be a square wave with positive and negative half waves proportional to the steady state $-1$ millivolt input signal $E_1$. The latter waveforms have not been shown in FIG. 4 since unnecessary to an understanding of the system of FIGS. 2B–2D. The waveforms if continued would show $E_4$ increasing slightly in a negative direction from its value $E_n$ because of the small negative input signal $E_1$.

Referring now to the waveform $E_6$, it will be seen that the capacitor 17 is effective to correct for the quiescent output potential of the amplifier 16 developed during the correction part of a cycle of operation. For example, during the correction time occurring between times $T_{10}$ and $T_{11}$, the capacitor 17 receives a charge equal to the quiescent potential $E_e$ appearing at the output of amplifier 16, with its lefthand plate charged negative with respect to its righthand plate. At the next-occurring operational part of the cycle starting at time $T_{12}$, switch 30 is in its circuit-interrupting state and the potential stored on capacitor 17 is algebraically added to the negative signal output of the amplifier 16 ($E_5$). In this manner, the quiescent output potential of the amplifier 16 produced during the corrective part of the cycle of operation is effectively subtracted or removed from the signal output of amplifier 16 to produce a corrected output signal $E_f$ from the comparator amplifier 10. Notwithstanding the changes in the amplitudes of the waveforms $E_3$, $E_4$ and $E_5$, the output signals $E_6$ during the occurrence of the high valued input signal from time $T_0$ to time $T_a$ are of constant amplitude and during the time of application of the low-valued signal all output signals are of substantially constant amplitude notwithstanding a change in the input signal from $+2$ volts to $-1$ millivolt. Where the changes in the input signal are of a lower order, the uniformity of amplitude of the output signals will be greater, a $-1$ millivolt signal and above producing a "normal" maximum output of constant amplitude. It is in this manner that the system of the present invention is ideally suited to analog-digital converter systems of the type described above.

Figure 5:
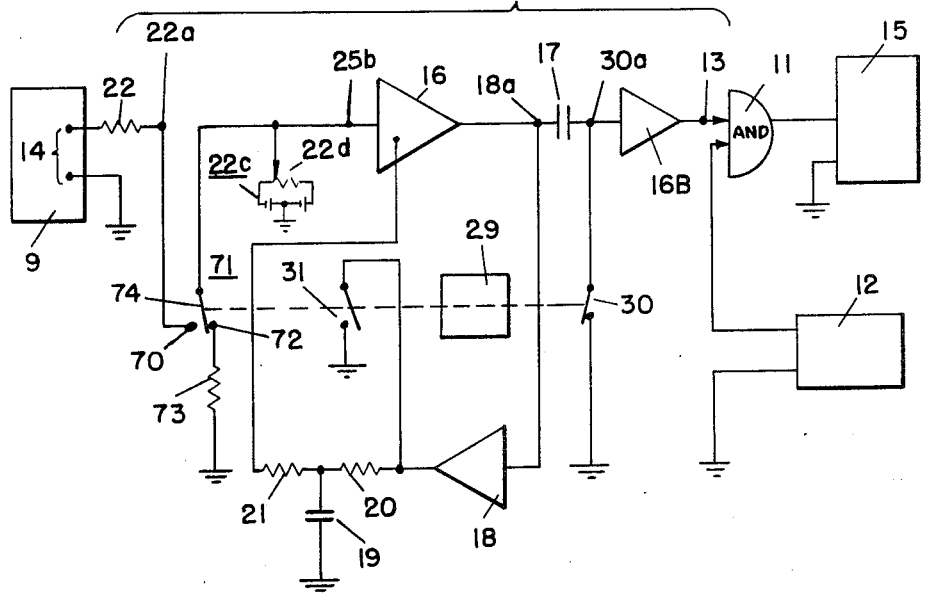
FIG. 5 is a block diagram of a further embodiment of the invention.

With the above understanding of the invention, it will be readily understood that many variations may be made in circuits of the circuit arrangements all within the scope of the appended claims. For example, switch 27, capacitor 23, amplifier 24 and resistor 25 of FIG. 1 may all be replaced, as shown in FIG. 5, by the switch 71 and the resistor 73. The remaining parts of FIG. 5 are identical with those of FIG. 1 and therefore have been identified with identical reference characters.

The switch 71 includes a switching element 74 and contacts 70 and 72. With the element or reed 74 touching the contact 70, the input signal is applied to the input of the amplifier 16 and with the element 74 touching the contact 72 (the illustrated position) the input of the amplifier 16 or point 25b is connected by way of resistor 73 to ground.

If it is assumed that the resistor 22 is representative of the resistance of the input signal source, the resistor 73 is selected to have the value equal to that resistance. In this manner, with the reed 74 touching the contact 70, the resistance of point 25b with respect to ground is equal to the resistance with respect to ground with reed 74 touching the contact 72. Thus the impedance, as seen by the input of the direct coupled amplifier 16, remains constant as the element 74 vibrates between its two positions. The foregoing is of particular importance when the amplifier 16 is comprised of transistors, as illustrated in FIG. 2C, for the reason that the bias developed at the base of transistor 16a will vary if the resistance at its input with respect to ground also varies. Such a varying bias is undesirable for the reason that it would effectively appear as a varying input signal. With the proper selection of the resistor 73 as just described, the bias at the base of the input transistor remains constant for vibrations of the reed 74 and the only signal input thereto results from input signals applied to the input terminals 14.

As previously described with respect to FIG. 1, one or two vibrating reeds may be utilized for operation of switches 30 and 31. It will now be understood that the switching element of reed 74 may be an additional reed operated in synchronism with the reed or reeds operating switches 30 and 31. Thus, in their illustrated position, with switch 30 closed and switch 31 open, the element 74 engages the contact 72 and when switch 30 is open and switch 31 closed, then element or reed 74 engages contact 70. For a further description of operation, reference may be had to the description of FIG. 1 which applies to the like-numbered parts of FIG. 5.

What is claimed is:

1. An amplifier of the periodically sampling type having measuring periods and non-measuring periods comprising input and output terminals referenced to a source of reference potential, a negative feedback circuit connected between the input and output terminals of said amplifier, a capacitor connected to said output terminal of said amplifier in series-circuit relationship with a utilization device for storing a portion of the voltage at said output terminal during each non-measuring period and applying it as a series compensation in series opposition with the output voltage of said amplifier during the subsequent measuring period, an energy storing means connected between an intermediate point in said feedback circuit and reference potential for applying the voltage of said energy storing means to said amplifier as a compensating signal continuously, first, second and third switching means, said first switching means being connected to said input terminal for applying a signal to be measured to said input terminal only during measuring periods, said second switching means being connected between the side of said capacitor remote from said output terminal and said source of reference potential for applying reference potential to the last-named side of said capacitor during said non-measuring periods, said third switching means being connected to said output terminal and to said feedback circuit for applying to said feedback circuit the voltage at said output terminal during said non-measuring periods thereby sensing the magnitude of the voltage at said output terminal during the non-measuring periods, and a cyclically actuated circuit controller for producing concurrent operation of said first, second and third switching means in said measuring and non-measuring periods, said first, second and third switching means being concurrently actuated by said circuit controller so that during measuring periods said signal to be measured is applied to said input terminal, an output signal is developed at said last-named side of said capacitor and the voltage at said output terminal is not applied to said feedback circuit, whereas during said non-measuring periods said signal to be measured is not applied to said input terminal, reference potential is applied to said last-named side of said capacitor and the voltage at said output terminal is applied to said feedback circuit.

2. An amplifier of the periodically sampling type having measuring periods and non-measuring periods comprising input and output terminals referenced to a source of reference potential, a negative feedback circuit connected between the input and output terminals of said amplifier, a first capacitor connected to said output terminal of said amplifier in series-circuit relationship with a high impedance utilization device for storing a portion of the voltage at said output terminal during each non-measuring period and applying it as a series compensation in series opposition with the output voltage of said amplifier during the subsequent measuring period, a second capacitor connected between an intermediate point in said feedback circuit and to said source of reference potential for continuously applying the voltage of said second capacitor to an input terminal as a compensating signal, a source of input signals to be measured, a high input impedance preamplifier having its output connected to an input terminal of said amplifier, a third capacitor having one side connected to the input of said high input impedance preamplifier, first, second and third switching means, said first switching means being connected to the other side of said third capacitor for applying a signal to be measured to said third capacitor only during measuring periods, said second switching means being connected between the side of said first capacitor remote from said output terminal and said source of reference potential for applying reference potential to the last-named side of said first capacitor during non-measuring periods, said third switching means being connected to said output terminal and to said feedback circuit for applying to said feedback circuit the voltage at said output terminal during said non-measuring periods thereby sensing the magnitude of the voltage at said output terminal during the non-measuring periods, and a cyclically actuated circuit controller for producing concurrent operation of said first, second and third switching means in said measuring and non-measuring periods, said first, second and third switching means being concurrently actuated by said circuit controller so that during measuring periods said signal to be measured is applied to said input terminal, an output signal is developed at said last-named side of said first capacitor and the voltage at said output terminal is not applied to said feedback circuit, whereas during said non-measuring periods said signal to be measured is not applied to said input terminal, reference potential is applied to said last-named side of said first capacitor and the voltage at said output terminal is applied to said feedback circuit.

3. The combination with a direct coupled amplifier of the periodically sampling type having measuring periods and non-measuring periods and including an input terminal and an output terminal referenced to a source of reference potential, of means for compensating for error in the quiescent output voltage of said amplifier comprising a first capacitor connected to said output terminal of said amplifier in series-circuit relationship with a utilization device for storing a portion of said error output voltage during each non-measuring period and for applying it as a series compensation in series opposition with the output voltage of said amplifier during the subsequent measuring period, a feedback circuit connected between said output terminal and said input terminal, a second capacitor connected between an intermediate point in said feedback circuit and to said source of reference potential for applying the voltage of said second capacitor to said input terminal as a compensating signal during the subsequent measuring period, a source of input signals to be measured having a source impedance, impedance means of value equal to said source impedance and having one end thereof connected to said source of reference potential, first, second and third switching means, said first switching means being connected to said input terminal for applying a signal to be measured to said input terminal only during the measuring periods, said second switching means being connected between the side of said first capacitor remote from said output terminal and said source of reference potential for applying reference potential to the last-named side of said first capacitor during said non-measuring periods, said third switching means being connected to said output terminal and to said feedback circuit for applying to said feedback circuit the voltage at said output terminal during said non-measuring periods thereby sensing the magnitude of the voltage at said output terminal during the non-measuring periods, and a cyclically actuated circuit controller for producing concurrent operation of said first, second and third switching means in said measuring and non-measuring periods, said first, second and third switching means being concurrently actuated by said circuit controller so that during measuring periods said signal to be measured is applied to said input terminal, an output signal is developed at said last-named side of said first capacitor and the voltage at said output terminal is not applied to said feedback circuit, whereas during said non-measuring periods said signal to be measured is not applied to said input terminal, reference potential is applied to said last-named side of said first capacitor and the voltage at said output terminal is applied to said feedback circuit.

4. The combination of claim 1 in which said amplifier includes a plurality of direct coupled stages and in which said negative feedback circuit extends from the output of said direct coupled stages to an input of said direct coupled stages.

5. The combination of claim 1 in which said circuit controller means operates to connect the side of said capacitor remote from said output terminal to said source of reference potential and to apply the voltage at said output terminal to said feedback circuit after said signal to be measured has been applied to said input terminal and to disconnect said side of said capacitor remote from said output terminal from said source of reference potential and to discontinue the application of said voltage at said output terminal to said feedback circuit prior to discontinuing the application of said signal to be measured to said input terminal.

6. The combination of claim 1 in which said energy-storing means comprises a filter capacitor and filtering resistors in series-circuit relation therewith to provide a time constant which is long as compared with the period of operation of said circuit controller means.

7. The combination of claim 4 in which
each of said direct coupled stages comprises a pair of transistors,
means connecting the collector of a first of said pair of transistors to the emitter of a second of said pair,
a constant current source of supply including a diode connected to the emitter of said first transistor, and
means including a source of supply connected between the common connection of said first and second transistors and said base of said second transistor for maintaining conductive said second transistor.

8. The combination of claim 2 in which
said first, second and third switching means includes first, second and third electronic switching circuits and in which said circuit controller includes
a pulse generator for applying to an input of each of said switching circuits input pulses for operating said switching circuits.

9. The combination of claim 8 in which
each of said switching circuits includes at least one transistor and in which there is provided
means including a diode for applying said input pulses to an input terminal of each of said transistors for selectively changing the conductivity states of said last-named transistors.

10. The combination of claim 8 in which said pulse generator produces a square wave input pulse for application to the switching circuit associated with said input circuit and input pulses of pulse width smaller than the width of said square wave for application to the switching circuit associated with said output circuit and said negative feedback circuit whereby said source of reference potential is connected to said output circuit and said feedback circuit is connected to said output circuit after said input circuit has been connected to said source of reference potential and said reference potential is disconnected from said output circuit and said feedback circuit is disconnected from said output circuit prior to the disconnection of said input circuit from said source of reference potential.

11. The combination of claim 8 in which said switch-in circuit associated with said negative feedback circuit is operative to connect said source of reference potential to said feedback amplifier effectively to disconnect said feedback circuit from said output circuit of said amplifier and for disconnecting said source of reference potential from said feedback amplifier effectively to connect said feedback circuit to said output circuit of said amplifier.

References Cited by the Examiner
UNITED STATES PATENTS

| 2,954,529 | 9/1960 | Offner | 330—9 |
| 2,970,266 | 1/1961 | Molloy et al. | 330—9 X |

ROY LAKE, *Primary Examiner.*
NATHAN KAUFMAN, *Examiner.*